(12) United States Patent
Zhu

(10) Patent No.: US 12,041,590 B2
(45) Date of Patent: Jul. 16, 2024

(54) CARRIER CONFIGURATION METHOD AND DEVICE

(71) Applicant: BEIJING XIAOMI MOBILE SOFTWARE CO., LTD., Beijing (CN)

(72) Inventor: Yajun Zhu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 502 days.

(21) Appl. No.: 17/418,701

(22) PCT Filed: Dec. 28, 2018

(86) PCT No.: PCT/CN2018/124811
§ 371 (c)(1),
(2) Date: Jun. 25, 2021

(87) PCT Pub. No.: WO2020/133200
PCT Pub. Date: Jul. 2, 2020

(65) Prior Publication Data
US 2022/0070863 A1 Mar. 3, 2022

(51) Int. Cl.
*H04W 72/0453* (2023.01)
(52) U.S. Cl.
CPC .............. *H04W 72/0453* (2013.01)
(58) Field of Classification Search
None
See application file for complete search history.

(56) References Cited

U.S. PATENT DOCUMENTS

| | | | | |
|---|---|---|---|---|
| 8,848,729 | B2 * | 9/2014 | Chen | H04W 52/0229 370/437 |
| 8,976,694 | B2 * | 3/2015 | Feuersanger | H04L 5/0098 370/252 |
| 8,995,368 | B2 * | 3/2015 | Moon | H04L 5/0053 455/450 |
| 9,055,585 | B2 * | 6/2015 | Lohr | H04L 5/0057 |
| 9,215,705 | B2 * | 12/2015 | Seo | H03M 13/3723 |

(Continued)

FOREIGN PATENT DOCUMENTS

| | | |
|---|---|---|
| CN | 101784081 A | 7/2010 |
| CN | 102149208 A | 8/2011 |

(Continued)

OTHER PUBLICATIONS

Apple Inc."Power Saving Techniques based on UE Adaptation", 3GPP TSG-RAN WGI Meeting #95, RI-1812925, Spokane, USA, Nov. 12-16, 2018, (17 pages). (Year: 2018).*

(Continued)

*Primary Examiner* — Faiyazkhan Ghafoerkhan
(74) *Attorney, Agent, or Firm* — Arch & Lake LLP

(57) ABSTRACT

A method and an apparatus for carrier configuration, wherein the method includes: determining a target carrier, wherein the target carrier is a carrier on which a terminal is instructed to perform a target operation; and sending target information to the terminal for the terminal to perform the target operation on the target carrier after the terminal determines the target carrier according to the target information, wherein the target information is physical layer information and at least indicates carrier information of the target carrier.

19 Claims, 11 Drawing Sheets

(56) References Cited

U.S. PATENT DOCUMENTS

| | | | | |
|---|---|---|---|---|
| 9,220,107 B2* | 12/2015 | Loehr | | H04L 5/0096 |
| 9,247,562 B2* | 1/2016 | Kim | | H04L 5/001 |
| 9,414,387 B2* | 8/2016 | Loehr | | H04L 5/0098 |
| 9,455,813 B2* | 9/2016 | Kim | | H04W 72/51 |
| 9,961,718 B2* | 5/2018 | Vajapeyam | | H04W 52/0216 |
| 2012/0188886 A1* | 7/2012 | Chen | | H04L 5/0098 |
| | | | | 370/252 |
| 2012/0208583 A1* | 8/2012 | Chung | | H04L 27/2626 |
| | | | | 455/509 |
| 2012/0243499 A1* | 9/2012 | Moon | | H04L 5/0053 |
| | | | | 370/329 |
| 2012/0314679 A1* | 12/2012 | Lee | | H04W 72/20 |
| | | | | 370/329 |
| 2012/0320840 A1* | 12/2012 | Kim | | H04L 5/001 |
| | | | | 370/329 |
| 2013/0010720 A1* | 1/2013 | Lohr | | H04L 5/0057 |
| | | | | 370/329 |
| 2013/0016676 A1* | 1/2013 | Lohr | | H04L 5/0057 |
| | | | | 370/329 |
| 2013/0039202 A1* | 2/2013 | Feuersanger | | H04L 5/001 |
| | | | | 370/252 |
| 2013/0142142 A1* | 6/2013 | McBeath | | H04L 5/003 |
| | | | | 370/329 |
| 2013/0155868 A1* | 6/2013 | Seo | | H03M 13/3723 |
| | | | | 370/241 |
| 2013/0201964 A1* | 8/2013 | Kim | | H04L 1/0038 |
| | | | | 370/335 |
| 2014/0233480 A1* | 8/2014 | Kim | | H04L 5/001 |
| | | | | 370/329 |
| 2014/0362722 A1* | 12/2014 | Loehr | | H04L 5/0098 |
| | | | | 370/252 |
| 2015/0181604 A1* | 6/2015 | Feuersaenger | | H04L 5/0055 |
| | | | | 370/329 |
| 2015/0304093 A1* | 10/2015 | Loehr | | H04L 5/0098 |
| | | | | 370/329 |
| 2016/0286603 A1* | 9/2016 | Vajapeyam | | H04W 72/0453 |
| 2016/0316475 A1* | 10/2016 | Loehr | | H04L 5/0048 |
| 2016/0360535 A1* | 12/2016 | Kim | | H04L 5/0053 |
| 2017/0012760 A1* | 1/2017 | Feuersaenger | | H04L 5/0048 |
| 2017/0086172 A1* | 3/2017 | Dinan | | H04L 5/0048 |
| 2017/0093550 A1* | 3/2017 | Loehr | | H04L 5/001 |
| 2017/0325168 A1* | 11/2017 | Lee | | H04W 76/28 |
| 2017/0353284 A1* | 12/2017 | Loehr | | H04L 5/0096 |
| 2018/0206214 A1* | 7/2018 | Bendlin | | H04L 5/0053 |
| 2018/0254879 A1* | 9/2018 | Loehr | | H04L 1/0026 |
| 2019/0182017 A1* | 6/2019 | Feuersaenger | | H04W 72/0453 |
| 2019/0260560 A1* | 8/2019 | Loehr | | H04L 5/001 |
| 2020/0022174 A1* | 1/2020 | Karaki | | H04W 72/23 |
| 2020/0322117 A1* | 10/2020 | Feuersaenger | | H04W 72/0453 |
| 2022/0070863 A1* | 3/2022 | Zhu | | H04L 5/001 |

FOREIGN PATENT DOCUMENTS

| | | | | |
|---|---|---|---|---|
| CN | 102696273 A | 9/2012 | | |
| CN | 105264996 A | 1/2016 | | |
| CN | 10674232 A | 5/2017 | | |
| CN | 107223319 A | 9/2017 | | |
| CN | 107431978 A | 12/2017 | | |
| CN | 108886750 A | 11/2018 | | |
| CN | 108886789 A | 11/2018 | | |
| EP | 2360864 A1 * | 8/2011 | | H04L 1/0026 |
| EP | 2360864 A1 | 8/2011 | | |
| WO | 2013067857 A1 | 5/2013 | | |
| WO | 2018059596 A1 | 4/2018 | | |
| WO | 2020010631 A1 | 1/2020 | | |

OTHER PUBLICATIONS

International Search Report Issued in Application No. PCT/CN2018/124811, Sep. 27, 2019 and English translation, (4p).

European Patent Office, Extended European Search Report Issued in Application No. 18944844.2, Dec. 8, 2021, Germany, (15 pages).

ISA State Intellectual Property Office of the People's Republic of China, Written Opinion of the International Searching Authority Issued in Application No. PCT/CN2018/124811, Sep. 27, 2019, WIPO, (8 pages).

Apple Inc. "Power Saving Techniques based on UE Adaptation", 3GPP TSG-RAN WGI Meeting #95, RI-1812925, Spokane, USA, Nov. 12-16, 2018, (17 pages).

Apple Inc.,"Network-indication based Approaches for UE Power Saving", 3GPP TSG-RAN WGI Meeting #94bis, RI-1811127, Chengdu, China, Oct. 8-12, 2018, (6 pages).

The First CNOA Issued in Application No. 201880003370.7, dated Sep. 15, 2022, with Machine English Translation, (15p).

Indian Patent Office, Office Action Issued in Application No. 202147030939, Mar. 3, 2022, with partial English translation, 4 pages.

Qualcomm Europe, "Interpreting the carrier indicator field", 3GPP TSG RAN WG1 #59, R1-094862, Nov. 9-13, 2009, (4P).

Huawei,"Summary of the mail discussion on NR spectrum utilization efficiency enhancements", 3GPP TSG RAN Meeting #80, RP-181294, La Jolla, USA, Jun. 11-Jun. 14, 2018, (7P).

Institute for Information Industry (III), "The impact of BWP configuration and switching", 3GPP TSG-RAN WG2 NR Ad hoc 1801, R2-1800778, Vancouver, Canada, Jan. 22-Jan. 26, 2018, (5P).

* cited by examiner

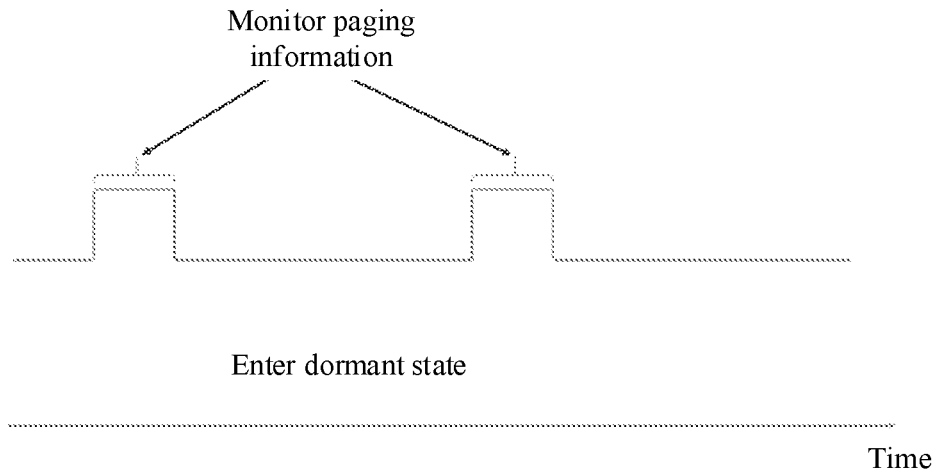
FIG. 1
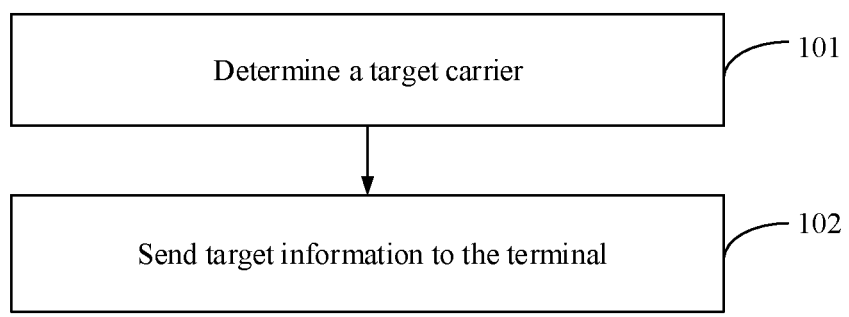
FIG. 2
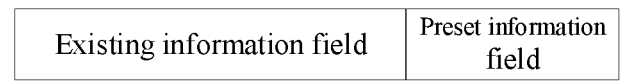
FIG. 3A
FIG. 3B

CARRIER CONFIGURATION METHOD AND DEVICE

CROSS REFERENCE TO RELATED APPLICATION

This application is a national stage of International Application No. PCT/CN2018/124811, filed on Dec. 28, 2018, the disclosure of which is incorporated herein by reference in its entirety for all purposes.

TECHNICAL FIELD

The present disclosure relates to the field of communication technologies, and in particular, to a method and an apparatus for carrier configuration.

BACKGROUND

In LTE (Long Term Evolution) system, in order to reduce detection overhead for a terminal, a dormant state is defined for the terminal. A terminal can enter the dormant state when the terminal has no data transmission, thus suspending detection of control signaling, and reducing energy consumption.

When a terminal is in the dormant state, the terminal has to periodically monitor a PDCCH (Physical Downlink Control Channel) based on configuration from a base station to determine whether the terminal is instructed to enter an active state. In order to monitor the PDCCH, the terminal has to continuously monitor the PDCCH for a period of time, which can cause the terminal to consume a certain amount of power, as shown in FIG. 1.

In order to support higher data transmission rates, a carrier aggregation technology has been introduced into a cellular communication system, that is, the base station can configure a number of carriers for the terminal in advance. Then, as the traffic volume for the terminal changes, the number of carriers activated for the terminal can be adjusted.

In the prior art, the activation or deactivation mechanism of the carriers can be based on MAC (Media Access Control) CE (Control Element) or based on a deactivation timer.

However, no matter whether the MAC CE or the deactivation timer is used for carrier activation or deactivation, a relatively large latency can occur, which will cause additional power consumption for the terminal.

SUMMARY

According to a first aspect of the present disclosure, a method for carrier configuration is provided, the method is used in a base station, and the method includes:
  determining a target carrier, wherein the target carrier is a carrier on which a terminal is instructed to perform a target operation: and
  sending target information to the terminal for the terminal to perform the target operation on the target carrier after the terminal determines the target carrier according to the target information, wherein the target information is physical layer information and at least indicates carrier information of the target carrier.

According to a second aspect of the present disclosure, a method for carrier configuration is provided, the method is used in a terminal, and the method includes:
  detecting whether target information sent by a base station is received, wherein the target information is physical layer information and at least indicates carrier information corresponding to a target carrier, and the target carrier is a carrier on which a terminal is instructed to perform a target operation:
  determining the target carrier according to the target information in response to that the target information is received performing the target operation on the target carrier.

According to a third aspect of the present disclosure, a non-transitory computer-readable storage medium is provided, wherein the storage medium stores a computer program, and the computer program is used to execute the method for carrier configuration described in the first aspect.

According to a fourth aspect of the present disclosure, a non-transitory computer-readable storage medium is provided, wherein the storage medium stores a computer program, and the computer program is used to execute the method for carrier configuration described in the second aspect.

According to a fifth aspect of the present disclosure, an apparatus for carrier configuration is provided, wherein the apparatus is used in a base station and includes:
  a processor: and
  a memory for storing processor executable instructions;
  wherein the processor is configured to:
  determine a target carrier, wherein the target carrier is a carrier on which a terminal is instructed to perform a target operation: and
  send target information to the terminal, such that after the terminal determines the target carrier according to the target information, the terminal performs the target operation on the target carrier, wherein the target information is physical layer information and at least indicates carrier information of the target carrier.

According to an sixth aspect of the present disclosure, an apparatus for carrier configuration is provided, wherein the apparatus is in a terminal and includes:
  a processor; and
  a memory for storing processor executable instructions;
  wherein the processor is configured to:
  detect whether target information sent by a base station is received, wherein the target information is carrier information which is physical layer information and at least indicates a target carrier, and the target carrier is a carrier on which a terminal is instructed to perform a target operation;
  determine the target carrier according to the target information when the target information is received;
  perform the target operation on the target carrier.

It is to be understood that the above general descriptions and the below detailed descriptions are merely exemplary and explanatory, and are not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 1 is a schematic diagram of a scenario in which a terminal periodically monitors a PDCCH in the related art.

FIG. 2 is a flowchart illustrating a method for carrier configuration according to an example.

FIGS. 3A to 3B are schematic diagrams illustrating scenarios of carrier configuration according to an example.

DETAILED DESCRIPTION OF THE EXAMPLES

Figure 4:
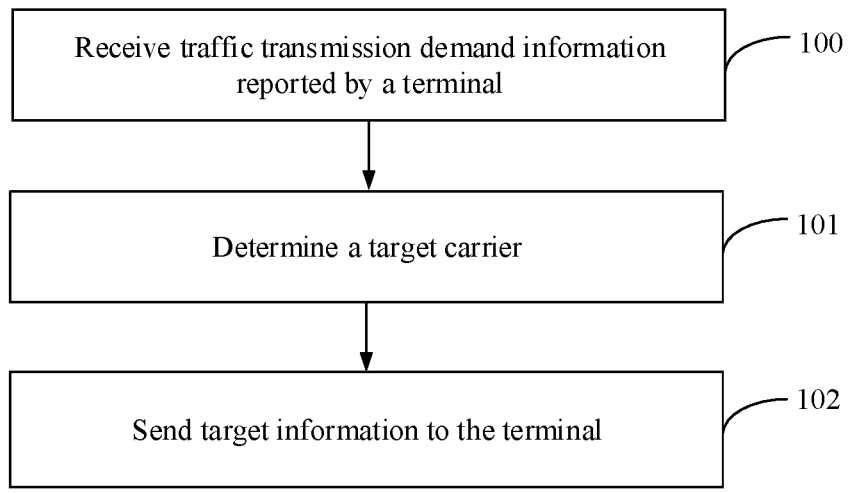
FIG. 4 is a flowchart illustrating another method for carrier configuration according to an example.

Examples will be described in detail herein, with the illustrations thereof represented in the drawings. When the following descriptions involve the drawings, like numerals in different drawings refer to like or similar elements unless otherwise indicated. The examples described in the following examples do not represent all examples consistent with the present disclosure. Rather, they are merely examples of apparatuses and methods consistent with some aspects of the present disclosure.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein is and includes any and all possible combinations of one or more of the associated listed items.

It is to be understood that, although terms "first," "second," "third," and the like can be used in the present disclosure to describe various information, such information should not be limited to these terms. These terms are only used to distinguish one category of information from another. For example, without departing from the scope of the present disclosure, first information can be referred as second information: and similarly, second information can also be referred as first information. Depending on the context, the word "if" as used herein can be interpreted as "when" or "upon" or "in response to determining".

A method for carrier configuration provided by the embodiments of the present disclosure will be first introduced from the base station side.

The embodiments of the present disclosure provide a method for carrier configuration, which can be used in a base station, such as an eNB (Evolved Node B) in an LTE system, and a gNB in a 5G system. Referring to FIG. 2, which is a flowchart illustrating a method for carrier configuration according to an example, the method can include the following steps.

At step 101, a target carrier is determined, where the target carrier is a carrier on which a terminal is instructed to perform a target operation.

At step 102, target information is sent to the terminal, where the target information is physical layer information and at least indicates carrier information corresponding to the target carrier.

In the embodiment, the base station first determines a target carrier for which the terminal is instructed to perform a target operation, and further, sends target information to the terminal, where the target information is physical layer information and at least indicates carrier information of the target carrier. The terminal side can determine the target carrier according to the target information, and then perform the target operation on the target carrier. Optionally, the target operation can be an activation operation or a deactivation operation. Through the above process, the physical layer information can be used to allow the terminal to quickly perform the target operation on the target carrier, which can have a less time delay and reduce energy consumption for the terminal.

For the step 101, the base station can automatically determine a target carrier on which a terminal is instructed to perform a target operation according to a downlink traffic demand of the terminal. Optionally, a number of target carriers can be a plurality, and the target operation can be an activation operation or a deactivation operation.

For example, when the volume of the downlink traffic of the terminal is relatively large. In order to ensure the normal operation of the terminal traffic, the base station can instruct the terminal to activate the target carrier. Conversely, when the volume of the downlink traffic of the terminal is relatively small and more carriers have been activated before, the base station can instruct the terminal to deactivate the target carrier from the activated carriers.

For the step 102, in the embodiment of the present disclosure, the target information is physical layer information, which can optionally be physical layer signaling, such as DCI (Downlink Control Information), or a physical layer signal (e.g., a bit set) in a plurality of preset physical layer signals.

At this step, if the target information is downlink control information, the base station can send the target information to the terminal in any of the following approaches.

In a first approach, the target information is carried in a preset information domain in first downlink control information, and then the first downlink control information is sent to the terminal.

In this approach, an information field can be additionally provided to current downlink control information as the preset information field, and the information field is used to carry the target information. For example, as shown in FIG. 3A.

The preset information field can have a fixed or variable length. When the preset information field has a variable length, the base station can determine the length of the preset information field according to the number of carriers previously configured for the terminal. Each bit represents whether a configured carrier requires a target operation, where the target operation is an activation operation or a deactivation operation. For example, if the number of carriers previously configured for the terminal is 8, the preset information field can have a length of 8 bits. For different terminals, if the number of configured carriers is different, the length of the corresponding preset information field is also different.

In a second approach, the target information is carried in second downlink control information in a preset format, and then the second downlink control information is sent to the terminal.

In this approach, the base station can carry the target information in the second downlink control information in a preset format. The preset format can be such that the downlink control information does not include other information fields, and only carries information used to represent each bit of whether the carrier is in the activate state, as shown in FIG. 3B. The second downlink control information can have information field of a fixed or variable length.

In the above two approaches, the target information can be represented by a bitmap, and each bit represents whether a configured carrier requires a target operation.

For example, if the number of carriers previously configured for the terminal is 5, the preset information field in the first control signaling has a length of 5 bits, or the second control signaling has a length of 5 bits, and each of the bits corresponds to whether a configured carrier is required to be activated or deactivated.

Optionally, a bit value of 1 can indicate that the carrier corresponding to the bit is required to be activated, and a bit value of 0 can indicate that the carrier corresponding to the bit does not need to be activated. Vice versa, a bit value of 1 can indicate that the carrier corresponding to the bit does not need to be activated, and a bit value of 0 can indicate that the carrier corresponding to the bit is required to be activated.

Alternatively, a bit value of 1 can indicate that the carrier corresponding to the bit is required to be deactivated, and a bit value of 0 can indicate that the carrier corresponding to the bit does not need to be deactivated. Vice versa, a bit value of 1 can indicate that the carrier corresponding to the bit does not need to be deactivated, and a bit value of 0 can indicate that the carrier corresponding to the bit is required to be deactivated.

At this step, if the target information is a target physical layer signal among a plurality of preset physical layer signals, the base station can directly send the target physical layer signal to the terminal. Subsequently, according to a corresponding relationship between physical layer signals predefined in the protocol or sent by the base station and carrier information corresponding to the second candidate carriers, the terminal can take the carrier information corresponding to the target physical layer signal sent by the base station as the carrier information corresponding to the target carrier.

In an embodiment, as shown in FIG. 4, which is a flowchart illustrating another method for carrier configuration according to the embodiment shown in FIG. 2, the above method can further include the following steps.

At step 100, traffic transmission demand information reported by a terminal is received, where the traffic transmission demand information includes carrier information corresponding to one or more first candidate carriers which the terminal instructs to activate or deactivate.

In the embodiment of the present disclosure, the terminal can send traffic transmission demand information to the base station according to a traffic requirement of the terminal, and the base station directly receives the traffic transmission demand information. The traffic transmission information includes the carrier information corresponding to the first candidate carriers for which the terminal instructs the base station to approve activation or deactivation. Optionally, the carrier information corresponding to the first candidate carriers can include the number of the first candidate carriers, the carrier identifiers of the first candidate carriers, and so on.

Further, the step 101 is specifically: taking all or part of the first candidate carriers as the target carrier.

For example, the terminal instructs the base station to approve the activation of carrier 1, carrier 2, and carrier 3 through traffic transmission demand information. The base station can take carrier 1, carrier 2 and carrier 3 as the target carriers according to the actual traffic demands of the terminal. Alternatively, the base station may consider that activating a part of the carriers can ensure the normal operation of the traffic for the terminal, thus takes only a part of the carriers, for example, carrier 1 and carrier 2, as the target carriers.

After the base station has determined the target carrier according to the traffic transmission demand information, the base station continues to perform step 102 as described above to send the target information to the terminal, for the terminal to activate the target carrier, or the base station sends the target information to the terminal, for the terminal to deactivate the target carrier.

In the embodiment, the base station can determine the target carrier according to the traffic transmission demand information reported by the terminal, and take all or part of the first candidate carriers that the terminal instructs to activate or deactivate as the target carrier. Therefore, it is possible to make the terminal to activate or deactivate the target carrier according to the traffic transmission demand information of the terminal, which leads to a high usability.

Figure 5:
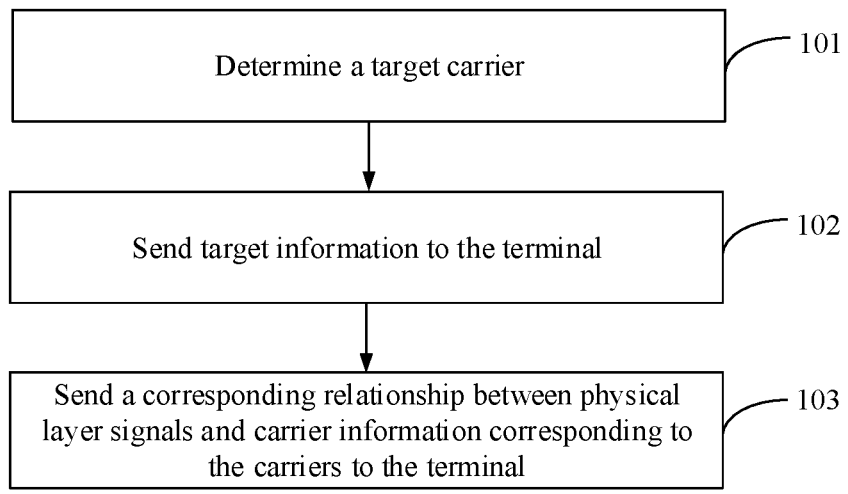
FIG. 5 is a flowchart illustrating another method for carrier configuration according to an example.

In an embodiment, if the target information is a target physical layer signal in a plurality of preset physical layer signals, referring to FIG. 5, which is a flowchart illustrating another method for carrier configuration according to the embodiment shown in FIG. 2, the above method can further include the following steps.

At step 103, a corresponding relationship between physical layer signals and carrier information corresponding to the carriers on which the target operation is instructed to perform is sent to the terminal.

This step can be performed before or after step 102, which is not limited in the present disclosure.

At this step, if the target information sent by the base station is a target physical layer signal, the base station can first send the corresponding relationship to the terminal. Each of the physical layer signals can correspond to one or more first candidate carriers. The corresponding relationship can be as shown in Table 1.

TABLE 1

| Physical layer signal | Carrier information of carrier that requires target operation |
|---|---|
| Signal 1 | Carrier 1 |
| Signal 2 | Carrier 1 and Carrier 2 |
| Signal 3 | Carrier 3, Carrier4 and Carrier 5 |
| ... | ... |
| Signal N | Carrier x and Carrier y |

After receiving the corresponding relationship and the target physical layer signal, the terminal can directly look up Table 1 to determine the carrier information corresponding to the target carrier, for example, carrier 2, corresponding to the target physical layer signal sent by the base station.

In the above embodiment, if the target information is a target physical layer signal among a plurality of preset physical layer signals, the base station can first send the corresponding relationship between physical layer signals and carrier information corresponding to second candidate carriers to the terminal, and the terminal subsequently can take the carrier information corresponding to a target physical layer signal as the carrier information corresponding to the target carrier according to the corresponding relationship, which can also allow the terminal to quickly determine the target carrier that needs to perform the target operation.

In the embodiment, step 103 is optional, and the corresponding relationship may be not sent to the terminal. The terminal can directly determine the carrier information corresponding to the target carrier according to a predetermined corresponding relationship in the protocol.

Figure 6:
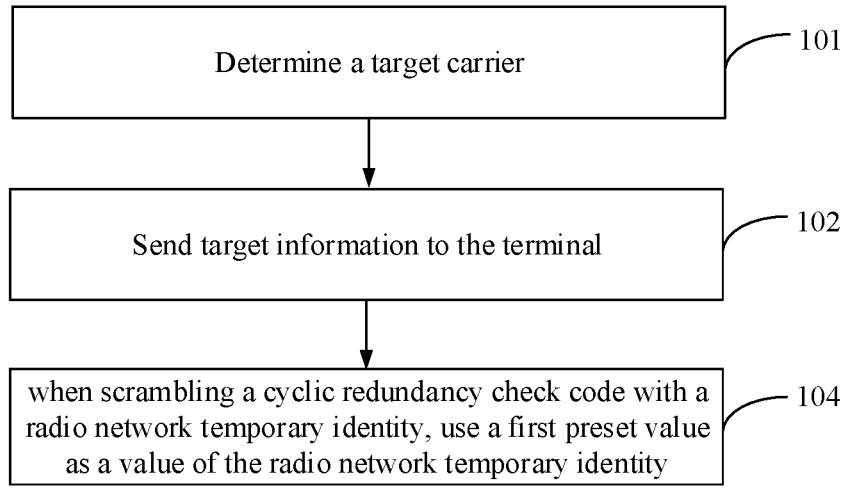
FIG. 6 is a flowchart illustrating another method for carrier configuration according to an example.

In an embodiment, referring to FIG. 6, which is a flowchart of another method for carrier configuration according to the embodiment shown in FIG. 2, the above method can further include the following steps.

At step 104, when a cyclic redundancy check code is scrambled with a RNTI (Radio Network Temporary Identity), a first preset value is used as a value of the RNTI.

The present disclosure does not limit the performing order of step 104 and steps 101 to 102.

At this step, when the base station is required to scramble CRC (Cyclic Redundancy Check) with RNTI, the base station can use a first preset value as the value of the scrambled RNTI, so that the terminal can determine that the base station has sent the target information to the terminal according to the value of the RNTI.

In the embodiment, the base station can use the first preset value as the value of the RNTI that scrambles the CRC code, so that the terminal can detect whether the target information has been received, which leads to a high usability.

In the following, the method for carrier configuration provided by the embodiments of the present disclosure will be introduced from the terminal side.

Figure 7:
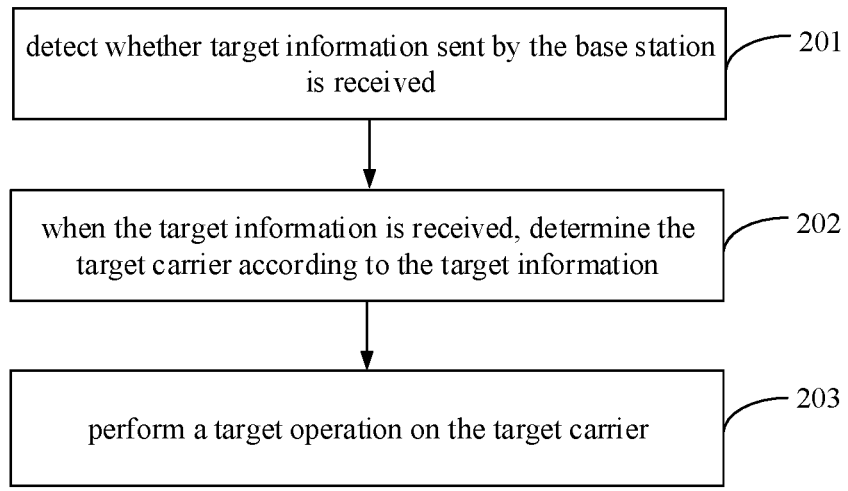
FIG. 7 is a flowchart illustrating another method for carrier configuration according to an example.

The embodiments of the present disclosure provide another method for carrier configuration, which can be performed in a terminal. Referring to FIG. 7, which is a flowchart of a method for carrier configuration according to an example, the method can include the following steps.

At step 201, it is detected whether target information sent by a base station is received, where the target information is carrier information which is physical layer information and at least indicates a target carrier, and the target carrier is a carrier on which a terminal is instructed to perform a target operation:

At step 202, when the target information is received, the target carrier is determined according to the target information:

At step 203, a target operation is performed on the target carrier.

In the embodiment, the terminal can detect whether the target information sent by the base station is received. The target information is physical layer information and at least indicates carrier information of the target carrier. The target carrier is a carrier on which a terminal is instructed to perform a target operation. The terminal can perform a target operation on the target carrier after the terminal determines the target carrier according to the received target information. Through the above process, the physical layer information can be used to allow the terminal to quickly perform the target operation on the target carrier, which can have a less time delay and reduce energy consumption for the terminal.

For the step 201, the terminal can detect whether the target information sent by the base station is received in any of the following approaches.

A first approach is to detect whether a preset information field of the received downlink control information includes target information.

In this approach, the terminal detects the information field of the received downlink control information. If the terminal detects that the preset information field is empty, the terminal determines that the target information is not received. If the preset information field is not empty, then the terminal can determine that the preset information field carries the target information, and then the terminal determines that the target information is received.

A second approach is to detect whether a format of the received downlink control information conforms to a preset format.

In this approach, the terminal detects the format of the received downlink control information to determine whether the received downlink control information conforms to a preset format. For example, the preset format can be such that the downlink control information includes no other information field than bits that represent whether each carrier is in the activated state. If the format of the downlink control information conforms to the preset format, it can be determined that the target information is received.

A third approach is to detect whether a RNTI scrambled with a CRC code is a first preset value.

In this approach, the terminal can detect whether the value of the RNTI scrambled with the CRC is the first preset value. If the value of the RNTI is the first preset value, the terminal determines that the target information is received, otherwise the terminal can consider the received downlink control information as the downlink control information in the related art, which does not include target information.

A fourth approach is to detect whether a physical layer signal sent by the base station belongs to a plurality of preset physical layer signals.

In this approach, if the terminal receives the physical layer signal sent by the base station, it can determine whether the physical layer signal belongs to the plurality of preset physical layer signals, for example, whether it belongs to any of the signals in Table 1. If the physical layer signal sent by the base station belongs to one of the plurality of preset physical layer signals, the terminal determines that the target information is received, and the physical layer signal sent by the base station is the target physical layer signal.

For the step 202, after the terminal determines that the terminal receives the target information, it can determine the target carrier according to any one of the following approaches.

A first approach is to determine a target carrier based on the bit value in the target information.

In this approach, if the bit value corresponding to the current carrier in the target information is a second preset value, it is determined that the current carrier is the target carrier that requires the target operation.

For example, if the bit value corresponding to the current carrier in the target information is 1, it can indicate that the carrier corresponding to the bit of the bit value needs to be activated, and the bit value of 0 can indicate that the carrier corresponding to the bit of the bit value does not need to be activated. Vice versa, if the bit value corresponding to the current carrier in the target information is 1, it can indicate that the carrier corresponding to the bit of the bit value does not need to be activated, and the bit value of 0 can indicate that the carrier corresponding to the bit of the bit value needs to be activated.

For another example, if the bit value corresponding to the current carrier in the target information is 1, it can indicate that the carrier corresponding to the bit of the bit value needs to be deactivated, and the bit value of 0 can indicate the carrier corresponding to the bit of the bit value does not need to be deactivated. Vice versa, if the bit value corresponding to the current carrier in the target information is 1, it can indicate that the carrier corresponding to the bit of the bit value does not require deactivated. If the bit value is 0, it can indicate that the carrier corresponding to the bit of the bit value needs to be deactivated.

In the second approach, the target carrier is determined according to the corresponding relationship between physical layer signal and carrier information in the active state.

In this approach, the terminal can directly use the carrier information corresponding to the target physical layer signal as the carrier information corresponding to the target carrier, according to the corresponding relationship between physical layer signal and carrier information corresponding to the second candidate carriers defined in the protocol, or the corresponding relationship previously sent by the base station.

For example, if the target physical layer signal sent by the base station is signal 2, the terminal can determine that the carriers corresponding to signal 2 are carrier 1 and carrier 2 according to Table 1. Then the terminal can use carrier 1 and carrier 2 as target carriers.

For the step 203, after the terminal determines the target carrier, the terminal can directly activate the target carrier or deactivate the target carrier.

For example, if the terminal determines that the target carriers are carrier 1 and carrier 2, and carrier 1 and carrier 2 are not currently activated, the terminal can perform activation operations on carrier 1 and carrier 2.

For another example, the terminal determines that the target carriers are carrier 1 and carrier 2, and carrier 1 and carrier 2 are currently activated. Then the terminal can perform deactivation operations on carrier 1 and carrier 2.

Figure 8:
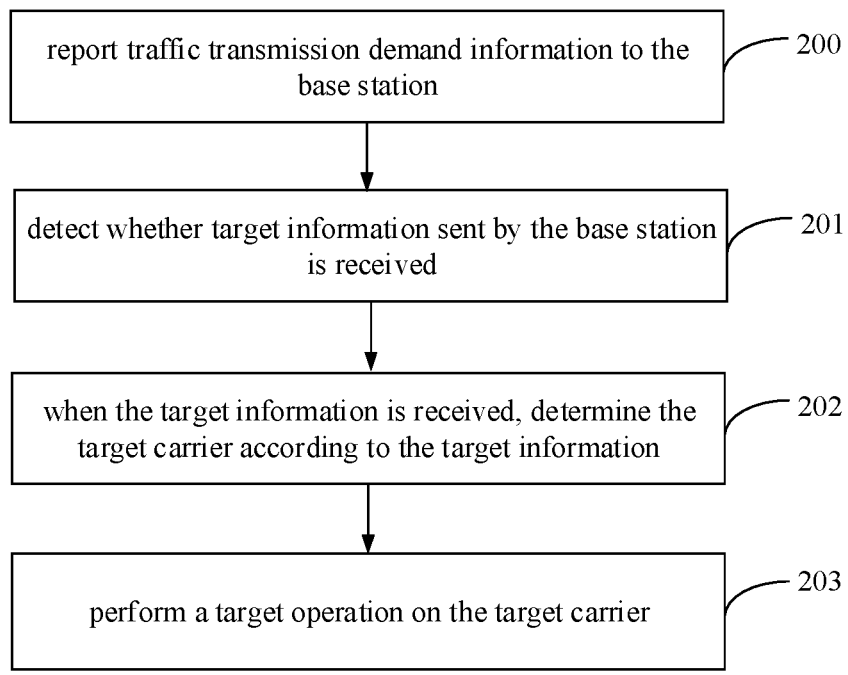
FIG. 8 is a flowchart illustrating another method for carrier configuration according to an example.

In an embodiment, as shown in FIG. 8, which is a flowchart illustrating another method for carrier configuration according to the embodiment shown in FIG. 7, prior to step 201, the method can further include the following steps.

At step 200, traffic transmission demand information is reported to the base station, where the traffic transmission demand information includes carrier information corresponding to one or more first candidate carriers which the terminal instructs to activate or deactivate.

At this step, the terminal can report traffic transmission demand information to the base station according to a traffic requirement of the terminal, and request the base station to approve to activate or deactivate the first candidate carriers. The carrier information of the first candidate carriers can include the number of carriers in the first candidate carriers, the carrier identifiers of the first candidate carriers, and so on.

After the base station receives the traffic transmission demand information, the terminal can perform step 201 to detect whether the target information sent by the base station is received.

In the embodiments of the present disclosure, in order to prevent the terminal from continuously or periodically detecting target information, which causes a waste of resources, optionally, step 201 can be specifically:

detecting whether the target information sent by the base station is received on at least one target time unit, where the target time unit is a time unit separated from a time unit for reporting the traffic transmission demand information by a preset number of time units.

For example, the terminal reports traffic transmission demand information on time unit 1, and the preset number of time units is 2, 3, and 4, then the terminal can detect whether the target information is received on time unit 3, time unit 4, and time unit 5.

Or the preset number of time units is 3, then the terminal can only detect whether the target information is received on time unit 4.

If the terminal detects and receives the target information sent by the base station on any target time unit, the terminal determines that the target information is received, and the terminal no longer needs to receive the target information: otherwise, the terminal determines that the target information is not received.

In the above embodiment, the terminal can report traffic transmission demand information to the base station, and after reporting the traffic transmission demand information to the base station, the terminal can detect on at least one target time unit whether the target information sent by the base station is received. Through the above process, the terminal can only detect whether the target information is received on the target time unit, avoiding waste of resources caused by detection on all time units.

Figure 9:
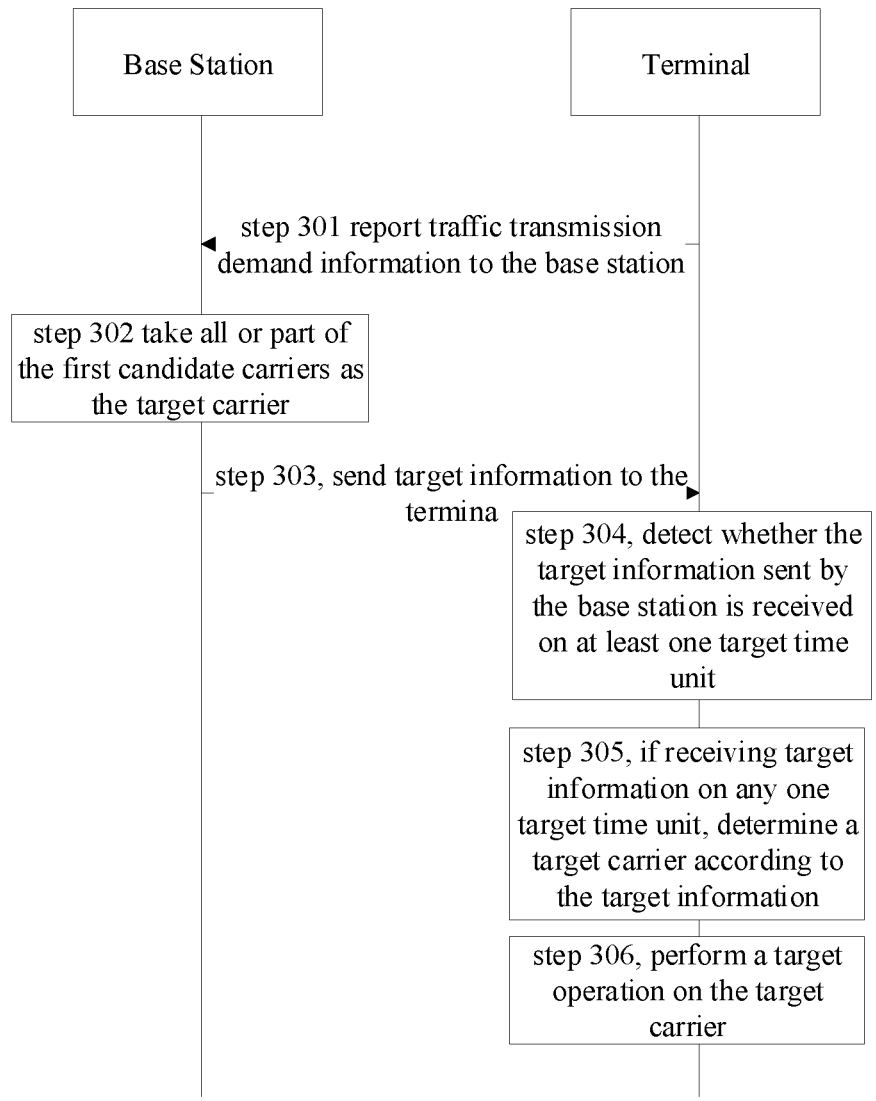
FIG. 9 is a flowchart illustrating another method for carrier configuration according to an example.

In an embodiment, as shown in FIG. 9, which is a flowchart of another method for carrier configuration according to an embodiment, the method for carrier configuration can include the following steps.

At step 301, the terminal reports traffic transmission demand information to the base station.

The traffic transmission demand information includes the carrier information corresponding to the first candidate carriers that the terminal instructs to activate or deactivate.

At step 302, the base station takes all or part of the first candidate carriers as the target carrier.

The target carrier is a carrier on which a terminal is instructed to perform a target operation. Optionally, the target operation can include an activation operation or a deactivation operation.

At step 303, the base station sends target information to the terminal, where the target information is physical layer information and at least indicates carrier information corresponding to the target carrier.

Optionally; the base station can send the first downlink control information to the terminal after carrying the target information through the preset information field in the first downlink control information, or send the second downlink control information to the terminal after carrying the target information through the second downlink control information in a preset format, or can also directly send the target physical layer signal to the terminal.

At step 304, the terminal detects whether the target information sent by the base station is received on at least one target time unit.

At step 305, if the terminal receives target information on any of the at least one target time unit, the terminal determines a target carrier according to the target information.

At step 306, the terminal performs a target operation on the target carrier.

In the embodiment, the base station can determine a target carrier according to the traffic transmission demand information reported by the terminal, and take all or part of the first candidate carriers requested by the terminal to be activated or deactivated as the target carrier. Further, the physical layer information allows the terminal to quickly perform the target operation on the target carrier, with less time delay and reducing the energy consumption for the terminal.

Figure 10:
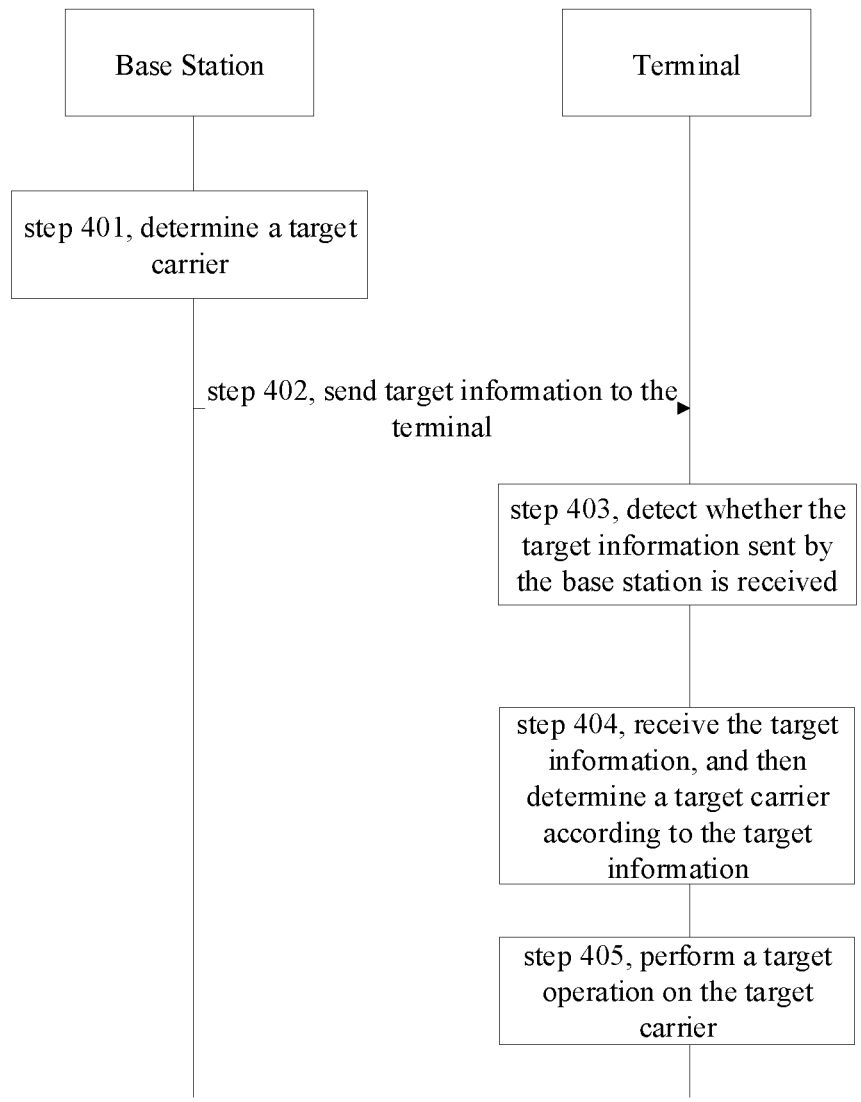
FIG. 10 is a flowchart illustrating another method for carrier configuration according to an example.

In an embodiment, as shown in FIG. 10, which is a flowchart illustrating another method for carrier configuration according to an embodiment, the method for carrier configuration can include the following steps.

At step 401, the base station determines a target carrier.

At this step, the base station can automatically determine a target carrier according to the traffic condition of the terminal, without requiring the terminal to report traffic transmission demand information.

At step 402, the base station sends target information to the terminal.

The target information is physical layer information and at least indicates carrier information corresponding to the target carrier.

Optionally; the base station can send the first downlink control information to the terminal after carrying the target information through the preset information field in the first downlink control information, or send the second downlink control information to the terminal after carrying the target information through the second downlink control information in the preset format, or can also directly send the target physical layer signal to the terminal.

At step 403, the terminal detects whether the target information sent by the base station is received.

At step 404, if the terminal receives the target information, the terminal determines a target carrier according to the target information.

At step 405, a target operation is performed on the target carrier.

The target operation can include an activation operation or a deactivation operation.

In the embodiment, without requiring the terminal to report traffic transmission demand information, the base station can automatically determine a target carrier. Furthermore, the physical layer information allows the terminal to quickly perform target operations on the target carrier, with less delay and reducing energy consumption for the terminal.

Corresponding to the method embodiments implementing application functions, the present disclosure also provides apparatus implementing application functions, and corresponding base station and terminal embodiments.

Figure 11:
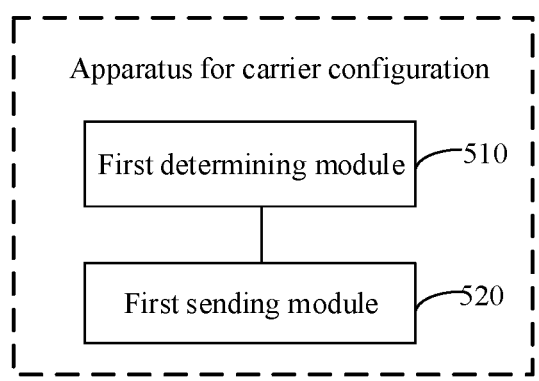
FIG. 11 is a block diagram illustrating an apparatus for carrier configuration according to an example.

Referring to FIG. 11, which is a block diagram illustrating an apparatus for carrier configuration according to an example. The apparatus is used in a base station, and the apparatus includes:

a first determining module 510 configured to determine a target carrier, wherein the target carrier is a carrier on which a terminal is instructed to perform a target operation;

a first sending module 520 configured to send target information to the terminal, for the terminal to perform the target operation on the target carrier after the terminal determines the target carrier according to the target information, wherein the target information is physical layer information and at least indicates carrier information corresponding to the target carrier.

Figure 12:
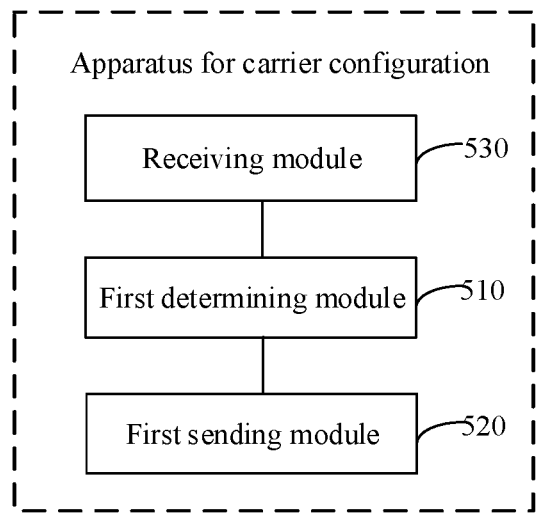
FIG. 12 is a block diagram illustrating another apparatus for carrier configuration according to an example.

Referring to FIG. 12, which is a block diagram illustrating another apparatus for carrier configuration based on the embodiment shown in FIG. 11, the apparatus further includes:

a receiving module 530 configured to receive traffic transmission demand information reported by the terminal, wherein the traffic transmission demand information comprises carrier information corresponding to one or more first candidate carriers which the terminal instructs to activate or deactivate.

The first determining module 510 includes:

a first determining submodule 511 configured to take all or part of the one or more first candidate carriers as the target carrier.

Figure 13:
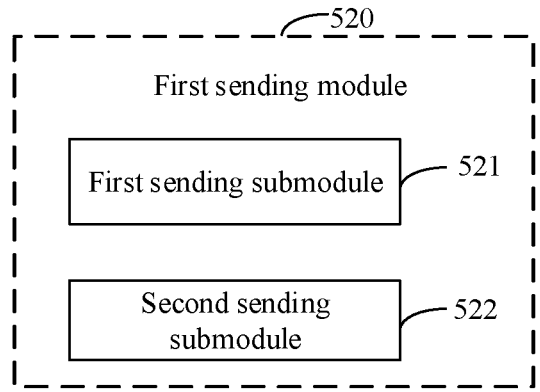
FIG. 13 is a block diagram illustrating another apparatus for carrier configuration according to an example.

Optionally, the target information is downlink control information:

Referring to FIG. 13, which is a block diagram illustrating another apparatus for carrier configuration based on the embodiment shown in FIG. 11, the first sending module 520 includes:

a first sending submodule 521 configured to send first downlink control information to the terminal after a preset information field in the first downlink control information carries the target information: or a second sending submodule 522 configured to send second downlink control information to the terminal after the second downlink control information in a preset format carries the target information.

Figure 14:
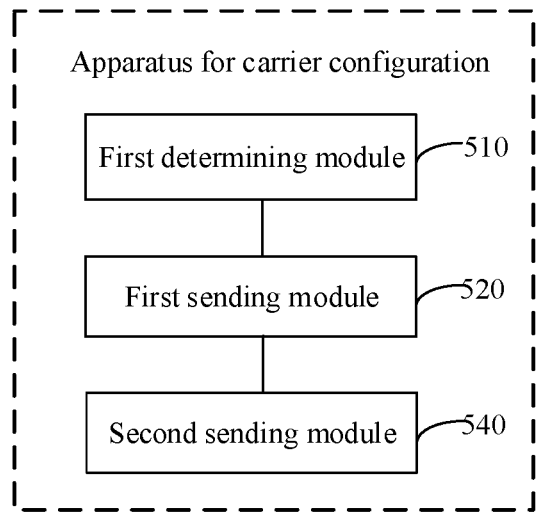
FIG. 14 is a block diagram illustrating another apparatus for carrier configuration according to an example.

Referring to FIG. 14, which is a block diagram illustrating another apparatus for carrier configuration shown on the basis of the embodiment shown in FIG. 11, the apparatus further includes:

a second sending module 540 configured to send a corresponding relationship between physical layer signals and carrier information corresponding to the second candidate carriers to the terminal, such that the terminal determines the target carrier corresponding to the target physical layer signal according to the corresponding relationship.

Figure 15:
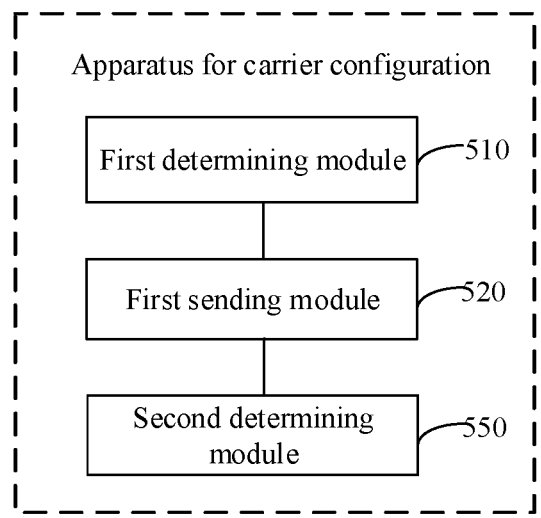
FIG. 15 is a block diagram illustrating another apparatus for carrier configuration according to an example.

Referring to FIG. 15, which is a block diagram illustrating another apparatus for carrier configuration shown on the basis of the embodiment shown in FIG. 11, the apparatus further includes:

a second determining module 550 configured to in response to scrambling a cyclic redundancy check code with a radio network temporary identity, use a first preset value as a value of the radio network temporary identity.

Optionally, the target operation includes an activation operation or a deactivation operation.

Figure 16:
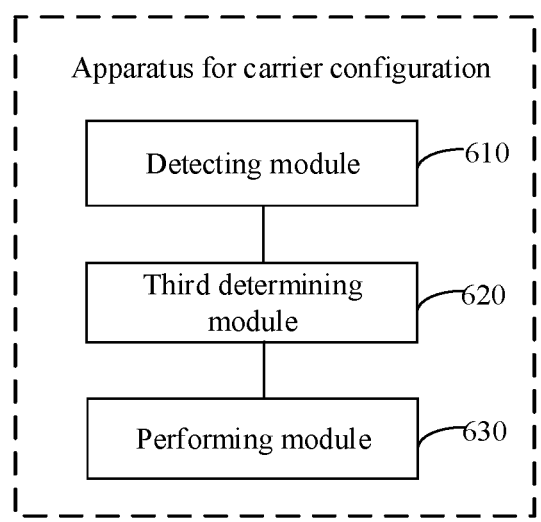
FIG. 16 is a block diagram illustrating another apparatus for carrier configuration according to an example.

Referring to FIG. 16, which is a block diagram illustrating an apparatus for carrier configuration according to an example. The apparatus is used in a terminal, and the apparatus includes:

a detecting module 610 configured to detect whether target information sent by a base station is received, wherein the target information is physical layer information and at least indicates carrier information corresponding to a target carrier, and the target carrier is a carrier on which a terminal is instructed to perform a target operation;

a third determining module 620 configured to determine the target carrier according to the target information in response to that the target information is received;

a performing module 630 configured to perform the target operation on the target carrier.

Figure 17:
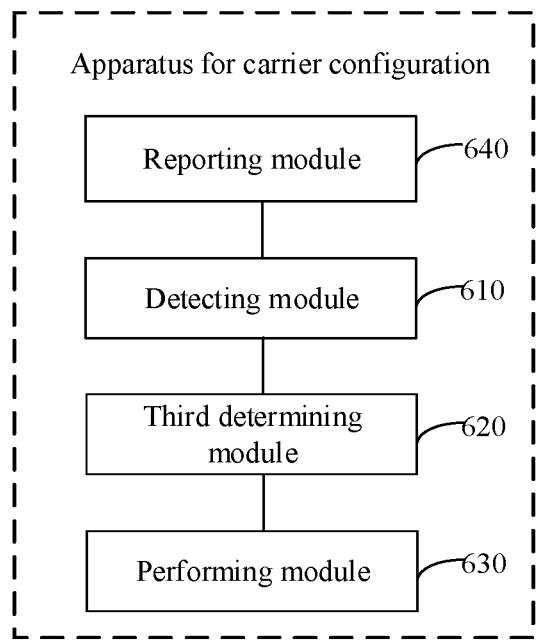
FIG. 17 is a block diagram illustrating another apparatus for carrier configuration according to an example.

Referring to FIG. 17, which is a block diagram of another apparatus for carrier configuration shown on the basis of the embodiment shown in FIG. 16, the apparatus further includes:

a reporting module 640 configured to report traffic transmission demand information to the base station, wherein the traffic transmission demand information comprises carrier information corresponding to one or more first candidate carriers which the terminal instructs to activate or deactivate.

Figure 18:
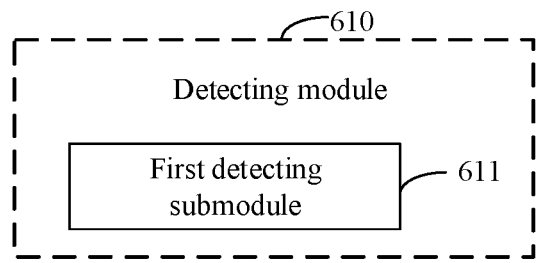
FIG. 18 is a block diagram illustrating another apparatus for carrier configuration according to an example.

Referring to FIG. 18, which is a block diagram of another apparatus for carrier configuration shown on the basis of the embodiment shown in FIG. 16, the detecting module 610 includes:

a first detecting submodule 611 configured to detect whether the target information sent by the base station is received on at least one target time unit, where the target time unit is a time unit separated from a time unit for reporting the traffic transmission demand information by a preset number of time units.

Figure 19:
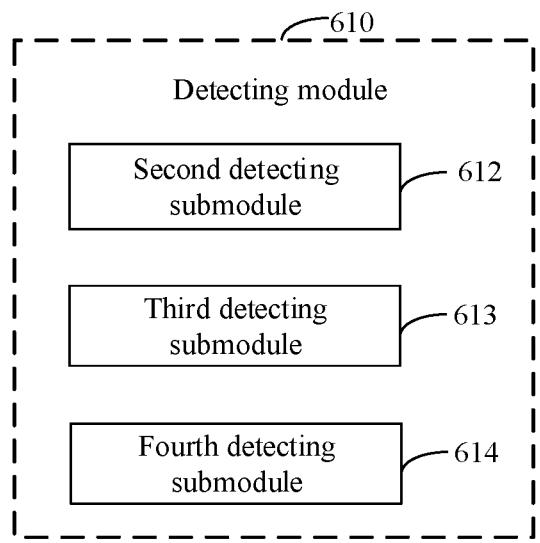
FIG. 19 is a block diagram illustrating another apparatus for carrier configuration according to an example.

Referring to FIG. 19, which is a block diagram of another apparatus for carrier configuration shown on the basis of the embodiment shown in FIG. 16, the detecting module 610 includes:

a second detecting submodule 612 configured to detect whether a preset information field of the received downlink control information includes the target information, and when the preset information field includes target information, determine that the target information is received: or a third detecting submodule 613 configured to detect whether the received downlink control information conforms to a preset format, and if the downlink control information conforms to the preset format, determine that the target information is received: or a fourth detecting submodule 614 configured to detect whether a value of a radio network temporary identity that scrambles a cyclic redundancy check code is a first preset value, and when the value of the radio network temporary identity is the first preset value, determine that the target information is received.

Figure 20:
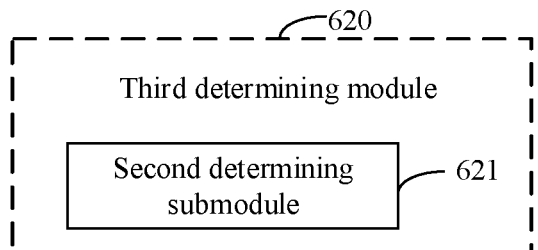
FIG. 20 is a block diagram illustrating another apparatus for carrier configuration according to an example.

Referring to FIG. 20, which is a block diagram illustrating another apparatus for carrier configuration shown on the basis of the embodiment shown in FIG. 19, the third determining module 620 includes:

a second determining submodule 621 configured to, when a bit value in the target information is a second preset value, determine a carrier corresponding to a bit where the bit value is located is the target carrier.

Figure 21:
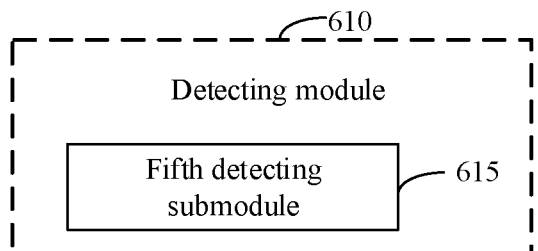
FIG. 21 is a block diagram illustrating another apparatus for carrier configuration according to an example.

Referring to FIG. 21, which is a block diagram illustrating another apparatus for carrier configuration shown on the basis of the embodiment shown in FIG. 16, the detecting module 610 includes:

a fifth detecting submodule 615 configured to detect whether a physical layer signal sent by the base station belongs to a plurality of preset physical layer signals, and when the physical layer signal sent by the base station belongs to the plurality of preset physical layer signals, determine that the target information is received.

Figure 22:
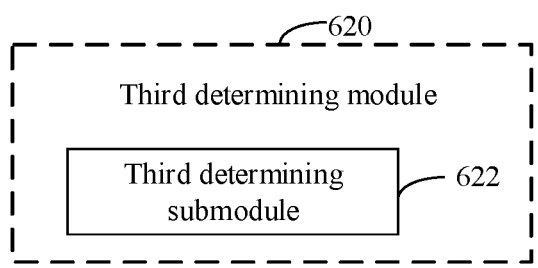
FIG. 22 is a block diagram illustrating another apparatus for carrier configuration according to an example.

Referring to FIG. 22, FIG. 22 is a block diagram of another apparatus for carrier configuration shown on the basis of the embodiment shown in FIG. 21, the third determining module 620 includes:

a third determining submodule 622 configured to take carrier information corresponding to the target physical layer signal as the carrier information corresponding to the target carrier according to a corresponding relationship between physical layer signals and carrier information corresponding to second candidate carriers.

Figure 23:
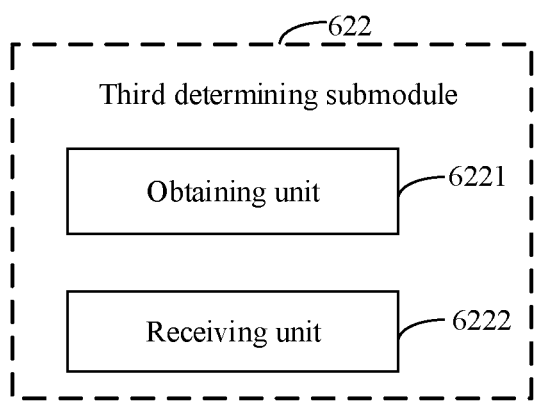
FIG. 23 is a block diagram illustrating another apparatus for carrier configuration according to an example.

Referring to FIG. 23, which is a block diagram of another apparatus for carrier configuration shown on the basis of the embodiment shown in FIG. 22, the third determining submodule 622 includes:

an obtaining unit 6221 configured to obtain the corresponding relationship predefined in a protocol; or a receiving unit 6222 configured to receive the corresponding relationship sent by the base station.

Optionally, the target operation includes an activation operation or a deactivation operation.

As for the apparatus embodiment, since it basically corresponds to the method embodiment, reference can be made to the part of the description of the method embodiment for related parts. The apparatus embodiments described above are merely illustrative. The units described above as separate components can or cannot be physically separated, and the components displayed as units can or cannot be physical units, that is, they can be located in one unit, or it can be distributed to multiple network units. Some or all of the modules can be selected according to actual needs to achieve the objectives of the solutions of the present disclosure. Those of ordinary skill in the art can understand and implement without creative work.

Correspondingly, the present disclosure also provides a computer-readable storage medium, the storage medium stores a computer program, and the computer program is used to execute any of the above-mentioned method for carrier configurations on the base station side.

Correspondingly, the present disclosure also provides a computer-readable storage medium, the storage medium stores a computer program, and the computer program is used to execute any of the above-mentioned method for carrier configurations on the terminal side.

Correspondingly, the present disclosure also provides an apparatus for carrier configuration, which is used in a base station, and includes:

a processor;

a memory used to store executable instructions of the processor;

wherein the processor is configured to:

determine a target carrier, where the target carrier is a carrier on which a terminal is instructed to perform a target operation;

send target information to the terminal for the terminal to perform the target operation on the target carrier after the terminal determines the target carrier according to the target information, wherein the target information is physical layer information and at least indicates carrier information of the target carrier.

Figure 24:
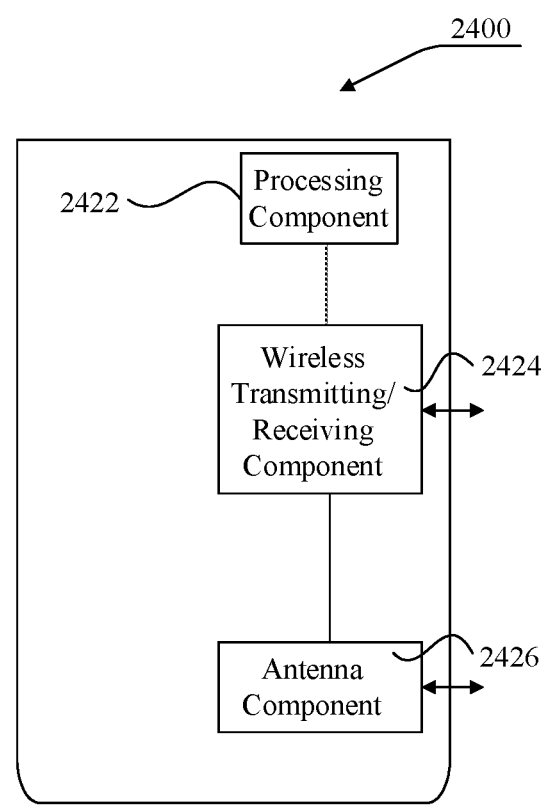
FIG. 24 is a schematic structural diagram illustrating an apparatus for carrier configuration according to an example of the present disclosure.

As shown in FIG. 24, FIG. 24 is a schematic structural diagram of an apparatus for carrier configuration 2400 according to an example. The apparatus 2400 can be provided as a base station. Referring to FIG. 24, the apparatus 2400 includes a processing component 2422, a wireless transmitting/receiving component 2424, an antenna component 2426, and a signal processing section specific to a wireless interface. The processing component 2422 can further include one or more processors.

One of the processors in the processing component 2422 can be configured to perform any of the foregoing method for carrier configurations on the base station side.

Correspondingly, the present disclosure also provides an apparatus for carrier configuration, which is used in a terminal, and includes:
- a processor;
- a memory used to store executable instructions of the processor;
- wherein the processor is configured to:
  - detect whether target information sent by a base station is received: where the target information is carrier information which is physical layer information and at least indicates a target carrier, and the target carrier is a carrier on which a terminal is instructed to perform a target operation;
  - determine a target carrier according to the target information when the target information is received;
  - perform a target operation on the target carrier.

Figure 25:
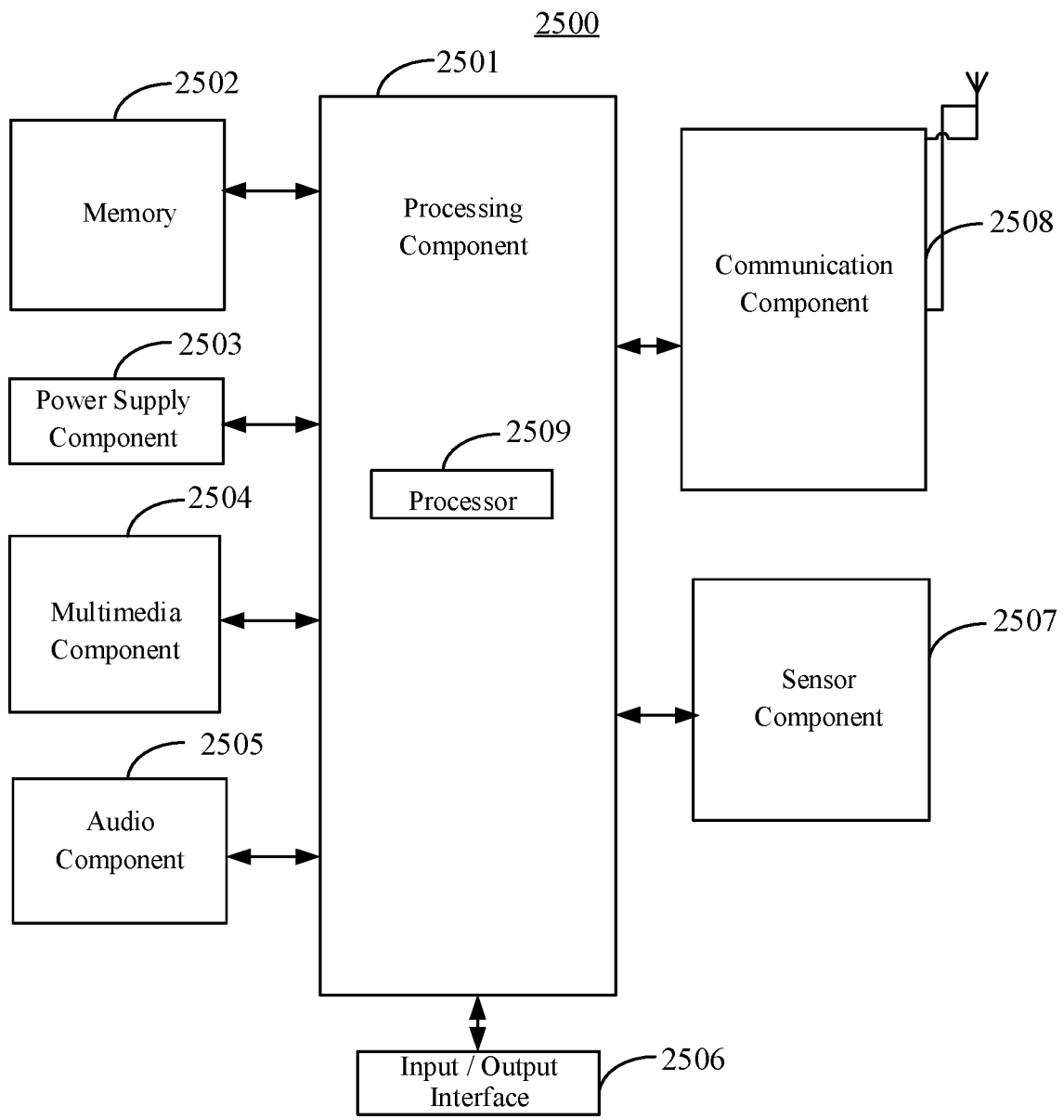
FIG. 25 is a schematic structural diagram of another apparatus for carrier configuration according to an example of the present disclosure.

FIG. 25 is a schematic structural diagram of another apparatus for carrier configuration according to an example. As shown in FIG. 25, an apparatus 2500 for carrier configuration is illustrated according to an example. The apparatus 2500 can be a terminal in an unlicensed spectrum, such as a computer, a mobile phone, a digital broadcasting terminal, a messaging device, a game console, a tablet device, a medical device, fitness equipment, a personal digital assistant, or other terminals.

As shown in FIG. 25, the apparatus 2500 can include one or more of the following components: a processing component 2501, a memory 2502, a power supply component 2503, a multimedia component 2504, an audio component 2505, an input/output (I/O) interface 2506, a sensor component 2507, and a communication component 2508.

The processing component 2501 generally controls overall operations of the apparatus 2500, such as operations associated with display, phone calls, data communications, camera operations, and recording operations. The processing component 2501 can include one or more processors 2509 to execute instructions to complete all or part of the steps of the above methods. In addition, the processing component 2501 can include one or more modules which facilitate the interaction between the processing component 2501 and other components. For example, the processing component 2501 can include a multimedia module to facilitate the interaction between the multimedia component 2504 and the processing component 2501.

The memory 2502 is to store various types of data to support the operation of the apparatus 2500. Examples of such data include instructions for any application or method operated on the apparatus 2500, contact data, phonebook data, messages, pictures, videos, and so on. The memory 2502 can be implemented by any type of volatile or nonvolatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 2503 supplies power for different components of the apparatus 2500. The power supply component 2503 can include a power supply management system, one or more power supplies, and other components associated with generating, managing and distributing power for the apparatus 2500.

The multimedia component 2504 includes a screen providing an output interface between the apparatus 2500 and a user. In some examples, the screen can include a Liquid Crystal Display (LCD) and a Touch Panel (TP). If the screen includes the TP, the screen can be implemented as a touch screen to receive input signals from the user. The TP can include one or more touch sensors to sense touches, swipes, and gestures on the TP. The touch sensors can not only sense a boundary of a touch or swipe, but also sense a duration and a pressure associated with the touch or swipe. In some examples, the multimedia component 2504 can include a front camera and/or a rear camera. The front camera and/or rear camera can receive external multimedia data when the apparatus 2500 is in an operating mode, such as a photographing mode or a video mode. Each of the front camera and the rear camera can be a fixed optical lens system or have focal length and optical zooming capability.

The audio component 2505 is to output and/or input an audio signal. For example, the audio component 2505 includes a microphone (MIC). When the apparatus 2500 is in an operating mode, such as a call mode, a record mode and a voice recognition mode, the microphone is to receive an external audio signal. The received audio signal can be further stored in the memory 2502 or sent via the communication component 2508. In some examples, the audio component 2505 further includes a speaker for outputting an audio signal.

The I/O interface 2506 provides an interface between the processing component 2501 and a peripheral interface module. The above peripheral interface module can be a keyboard, a click wheel, buttons, or the like. These buttons can include but not limited to, a home button, a volume button, a start button and a lock button.

The sensor component 2507 includes one or more sensors to provide status assessments of various aspects for the apparatus 2500. For example, the sensor component 2507 can detect the on/off status of the apparatus 2500, and relative positioning of component, for example, the component is a display and a keypad of the apparatus 2500. The sensor component 2507 can also detect a change in position of the apparatus 2500 or a component of the apparatus 2500, a presence or absence of the contact between a user and the apparatus 2500, an orientation or an acceleration/deceleration of the apparatus 2500, and a change in temperature of the apparatus 2500). The sensor component 2507 can include a proximity sensor to detect the presence of a nearby object without any physical contact. The sensor component 2507 can further include an optical sensor, such as a Complementary Metal-Oxide-Semiconductor (CMOS) or Charged Coupled Device (CCD) image sensor which is used in imaging applications. In some examples, the sensor component 2507 can further include an acceleration sensor, a gyroscope sensor, a magnetic sensor, a pressure sensor, or a temperature sensor.

The communication component 2508 is to facilitate wired or wireless communication between the apparatus 2500 and other devices. The apparatus 2500 can access a wireless network based on a communication standard, such as Wi-Fi, 2G or 3G or a combination thereof. In an example, the communication component 2508 receives a broadcast signal or broadcast related information from an external broadcast management system via a broadcast channel. In an example, the communication component 2508 can further include a Near Field Communication (NFC) module for promoting short-range communication. For example, the NFC module can be implemented based on a radio frequency identification (RFID) technology, an infrared data association (IrDA) technology, an ultra-wideband (UWB) technology, a Bluetooth® (BT) technology and other technologies.

In an example, the apparatus 2500 can be implemented by one or more Application Specific Integrated Circuits (ASICs). Digital Signal Processors (DSPs). Digital Signal Processing Devices (DSPDs), programmable Logic Devices (PLDs). Field Programmable Gate Arrays (FPGAs), controllers, microcontrollers, microprocessors, or other electronic components for performing the above methods.

In an example, a non-transitory computer readable storage medium including instructions is further provided, such as the memory 2502 including instructions. The above instructions can be executed by the processor 2520 of the apparatus 2500 to complete the method described above. For example, the non-transitory computer readable storage medium can be a Read-Only Memory (ROM), a Random Access Memory (RAM), a CD-ROM, a magnetic tape, a floppy disk, an optical data storage device, and so on.

Wherein, when the instructions in the storage medium are executed by the processor, the apparatus 2500 can execute any of the method for carrier configuration for the terminal side in an unlicensed spectrum.

The technical solutions provided by the embodiments of the present disclosure can include the following beneficial effects.

In the embodiments of the present disclosure, the base station first determines a target carrier for which the terminal is instructed to perform a target operation, and further, sends target information to the terminal, where the target information is physical layer information and at least indicates carrier information of the target carrier. The terminal side can determine the target carrier according to the target information, and then perform the target operation on the target carrier. Optionally, the target operation can be an activation operation or a deactivation operation. Through the above process, the physical layer information can be used to allow the terminal to quickly perform the target operation on the target carrier, which can have a less time delay and reduce energy consumption for the terminal.

In the embodiments of the present disclosure, the base station can determine the target carrier according to the traffic transmission demand information reported by the terminal, and take all or part of the first candidate carriers that the terminal instructs to activate or deactivate as the target carrier. Therefore, it is possible to make the terminal to activate or deactivate the target carrier according to the traffic transmission demand information of the terminal, which can have high usability.

In the embodiments of the present disclosure, if the target information is downlink control information, the base station can carry the target information in a preset information field in the first downlink control information, and then send the first downlink control information. Or, the base station can carry the target information in second downlink control information in a preset format and send second downlink control information to the terminal. Through the above process, the purpose of sending target information to the terminal can be achieved. Since the target information is carried by physical layer signaling, the terminal can quickly activate or deactivate the target carrier, which can have a less time delay and reduce energy consumption for the terminal.

In the embodiments of the present disclosure, if the target information is a target physical layer signal among a plurality of preset physical layer signals, the base station can first provide a corresponding relationship between physical layer signal and second candidate carrier to the terminal. Subsequently, the terminal determines the carrier information corresponding to a target physical layer signal according to the corresponding relationship, and takes the carrier information corresponding to the target physical layer signal as the carrier information of the target carrier, which can also allow the terminal to quickly determine the target carrier.

In the embodiments of the present disclosure, when the base station scrambles the cyclic redundancy check code with a RNTI, a first preset value can be used as the value of the RNTI, which is convenient to subsequently determine whether the target information is received according to the value of the RNTI. It is easy to implement and has high usability.

In the embodiments of the present disclosure, the terminal can detect whether the target information sent by the base station is received. The target information is physical layer information and at least indicates carrier information of the target carrier. The target carrier is a carrier on which a terminal is instructed to perform a target operation. The terminal can perform a target operation on the target carrier after the terminal determines the target carrier according to the received target information. Through the above process, the physical layer information can be used to allow the terminal to quickly perform the target operation on the target carrier, which can have a less time delay and reduce energy consumption for the terminal.

In the embodiments of the present disclosure, the terminal can report traffic transmission demand information to the base station, and after reporting the traffic transmission demand information to the base station, the terminal can detect on at least one target time unit whether the target information sent by the base station is received. Through the above process, the terminal can only detect whether the target information is received on the target time unit, avoiding waste of resources caused by detection on all time units.

In the embodiments of the present disclosure, if the terminal detects that the target information is included in a preset information field of the downlink control information, or the format of the downlink control information conforms to a preset format, or the cyclic redundancy check code is scrambled with a Radio Network Temporary Identity of a first preset value, the terminal can determine that the target information sent by the base station is received. Through the above process, the process of detecting whether the target information sent by the base station is received on the terminal side can be more flexible and highly usable.

In the embodiments of the present disclosure, if a bit value in the target information is a second preset value, the terminal can determine that the carrier corresponding to the bit of the bit value is the target carrier. It is easy to implement and has high usability.

In the embodiments of the present disclosure, if the terminal detects that the physical layer signal sent by the base station belongs to a plurality of preset physical layer signals, the terminal can also determine that the target information sent by the base station is received, so that the process of detecting whether the target information sent by the base station is received on the terminal side can be more flexible and highly usable.

In the embodiments of the present disclosure, the terminal can also use the carrier information corresponding to the target physical layer signal as the target carrier according to a corresponding relationship between physical layer signals and carrier information corresponding to second candidate carriers. In the embodiments of the present disclosure, different methods can be used to determine the target carrier that needs to be activated or deactivated according to the target information, which is simple to implement and has high usability.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module." "sub-module." "circuit." "sub-circuit." "circuitry." "sub-circuitry." "unit." or "sub-unit" may include memory (shared, dedicated, or group) that stores code or instructions that can be executed by one or more processors. The module refers herein may include one or more circuit with or without stored code or instructions. The module or circuit may include one or more components that are connected.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only.

It is to be understood that the present disclosure is not limited to the precise structure described above and shown in the accompanying drawings, and that various modifications and changes can be made without departing from the scope thereof.

What is claimed is:

1. A method of carrier configuration, being applicable to a base station, comprising:
    determining one or more target carriers, wherein a target carrier is a carrier on which a terminal is instructed to perform a target operation; and
    sending target information to the terminal for the terminal to perform the target operation on each target carrier after the terminal determines the one or more target carriers according to the target information, wherein the target information is physical layer information and at least indicates carrier information corresponding to the one or more target carriers;
    wherein the target information is downlink control information, and sending the target information to the terminal comprises:
    sending first downlink control information to the terminal after a preset information field in the first downlink control information carries the target information, wherein the preset information field has a variable length, the length of the preset information field is determined according to a number of carriers previously configured for the terminal, and each bit in the preset information field corresponds to a target operation of each target carrier.

2. The method of claim 1, further comprising:
    receiving traffic transmission demand information reported by the terminal, wherein the traffic transmission demand information comprises carrier information corresponding to one or more first candidate carriers which the terminal instructs to activate or deactivate; and
    wherein determining the one or more target carriers comprises:
    taking all or part of the one or more first candidate carriers as the one or more target carriers.

3. The method of claim 1, wherein:
    the target information is downlink control information; and
    wherein sending the target information to the terminal comprises:
    sending second downlink control information to the terminal after the second downlink control information in a preset format carries the target information.

4. The method of claim 1, wherein:
    the target information is a target physical layer signal among a plurality of preset physical layer signals, and, the method further comprises:
    sending, a corresponding relationship between physical layer signals and carrier information corresponding to second candidate carriers, to the terminal for the terminal to determine the one or more target carriers corresponding to a target physical layer signal according to the corresponding relationship.

5. The method of claim 1, further comprising:
    in response to scrambling a cyclic redundancy check code with a radio network temporary identity, using a first preset value as a value of the radio network temporary identity.

6. The method of claim 1, wherein the target operation comprises an activation operation or a deactivation operation.

7. A non-transitory computer-readable storage medium, wherein the storage medium stores a computer program, and the computer program is used to execute the method for carrier configuration according to claim 1.

8. A method of carrier configuration, being applicable to a terminal, and comprising:
    detecting whether target information sent by a base station is received, wherein the target information is physical layer information and at least indicates carrier information corresponding to one or more target carriers, and a target carrier is a carrier on which a terminal is instructed to perform a target operation;
    determining the one or more target carriers according to the target information in response to that the target information is received; and
    performing the target operation on each target carrier;
    wherein detecting whether the target information sent by the base station is received comprises:
    detecting whether a preset information field of received downlink control information comprises the target information, and in response to that the preset information field comprises the target information, determining that the target information is received, wherein the preset information field has a variable length, the length of the preset information field is determined according to a number of carriers previously configured for the terminal, and each bit in the preset information field corresponds to a target operation of each target carrier.

9. The method of claim 8, further comprising:
reporting traffic transmission demand information to the base station, wherein the traffic transmission demand information comprises carrier information corresponding to one or more first candidate carriers which the terminal instructs to activate or deactivate.

10. The method of claim 9, wherein detecting whether the target information sent by the base station is received comprises:
detecting whether the target information sent by the base station is received on at least one target time unit, wherein the target time unit is a time unit separated from a time unit for reporting the traffic transmission demand information by a preset number of time units.

11. The method of claim 8, wherein detecting whether the target information sent by the base station is received comprises:
detecting whether the received downlink control information conforms to a preset format, and in response to that the downlink control information conforms to the preset format, determining that the target information is received; or
detecting whether a value of a radio network temporary identity that scrambles a cyclic redundancy check code is a first preset value, and in response to that the value of the radio network temporary identity is the first preset value, determining that the target information is received.

12. The method of claim 11, wherein determining the one or more target carriers according to the target information comprises:
in response to that a bit value in the target information is a second preset value, determining a carrier corresponding to a bit where the bit value is located is the target carrier.

13. The method of claim 8, wherein detecting whether the target information sent by the base station is received comprises:
detecting whether a physical layer signal sent by the base station belongs to a plurality of preset physical layer signals, and
when the physical layer signal sent by the base station belongs to the plurality of preset physical layer signals, determining that the target information is received.

14. The method of claim 13, wherein determining the one or more target carriers according to the target information comprises:
taking carrier information corresponding to a target physical layer signal as the carrier information corresponding to the one or more target carriers according to a corresponding relationship between physical layer signals and carrier information corresponding to second candidate carriers.

15. The method of claim 14, wherein the corresponding relationship is determined by:
obtaining the corresponding relationship predefined in a protocol; or
receiving the corresponding relationship sent by the base station.

16. The method of claim 8, wherein the target operation comprises an activation operation or a deactivation operation.

17. A non-transitory computer-readable storage medium, wherein the storage medium stores a computer program, and the computer program is used to execute the method for carrier configuration according to claim 8.

18. An apparatus for carrier configuration, wherein the apparatus is used in a terminal and comprises:
a processor; and
a memory for storing processor executable instructions;
wherein the processor is configured to execute the method for carrier configuration according to claim 8.

19. An apparatus for carrier configuration, wherein the apparatus is used in a base station and comprises:
a processor; and
a memory for storing processor executable instructions;
wherein the processor is configured to:
determine one or more target carriers, wherein a target carrier is a carrier on which a terminal is instructed to perform a target operation; and
send target information to the terminal for the terminal to perform the target operation on the each target carrier after the terminal determines the one or more target carriers according to the target information, wherein the target information is physical layer information and at least indicates carrier information of the one or more target carriers;
wherein the target information is downlink control information, and sending the target information to the terminal comprises:
sending first downlink control information to the terminal after a preset information field in the first downlink control information carries the target information, wherein the preset information field has a variable length, the length of the preset information field is determined according to a number of carriers previously configured for the terminal, and each bit in the preset information field corresponds to a target operation of each target carrier.

* * * * *